(No Model.)  2 Sheets—Sheet 1.

T. W. CAPEN.
TRAVELING CRANE.

No. 278,774. Patented June 5, 1883.

WITNESSES
Wm A. Skinkle
Geo. W. Young

INVENTOR
Thomas W. Capen.
By his Attorneys
Baldwin, Hopkins, & Peyton.

(No Model.)  T. W. CAPEN.  2 Sheets—Sheet 2.
TRAVELING CRANE.

No. 278,774.  Patented June 5, 1883.

WITNESSES  
Wm A. Skinkle  
Edwin A. Newman

INVENTOR  
Thomas W. Capen  
By his Attorneys  
Baldwin, Hopkins & Peyton

UNITED STATES PATENT OFFICE.

THOMAS W. CAPEN, OF STAMFORD, CONNECTICUT, ASSIGNOR TO THE YALE & TOWNE MANUFACURING COMPANY, OF SAME PLACE.

TRAVELING CRANE.

SPECIFICATION forming part of Letters Patent No. 278,774, dated June 5, 1883.

Application filed April 4, 1883. (No model.)

*To all whom it may concern:*

Be it known that I, THOMAS W. CAPEN, of Stamford, in the county of Fairfield and State of Connecticut, have invented certain new and useful Improvements in Traveling Cranes, of which the following is a specification, reference being had to the accompanying drawings.

My invention relates to means for propelling the bridge of a traveling crane upon its longitudinal tracks in such a way that the two ends of the bridge will start at the same time and travel at equal speeds—in short, so that the motion of the bridge shall be in a direction parallel to its longitudinal tracks. This object has been accomplished by a device disclosed in the United States Patent of T. A. Weston, December 25, 1877, No. 198,718. This result has also been accomplished by devices disclosed in an application made by me April 2, 1883, in the United States Patent Office, No. 90,343.

Generally described, the device of Weston consists of two fixed cables, which are so fastened and passed over grip-wheels on the bridge that the revolution of the grip-wheels causes the bridge to move along, the cables always remaining stationary.

The devices shown in my said application consist in cables which have motion themselves and pull the bridge along. The devices for which I now make application for a patent consist either of one fixed cable passing over a grip-wheel or of a fixed cable passing over a grip-wheel and also a moving cable, which causes the desired squaring of the bridge or the parallelism of its motion with the longitudinal tracks.

It is obvious that the moving cable, instead of the fixed cable, might pass over the grip-wheel, and in that case the fixed cable would operate to cause the squaring of the bridge and the moving cable to move the bridge.

Figure 1:
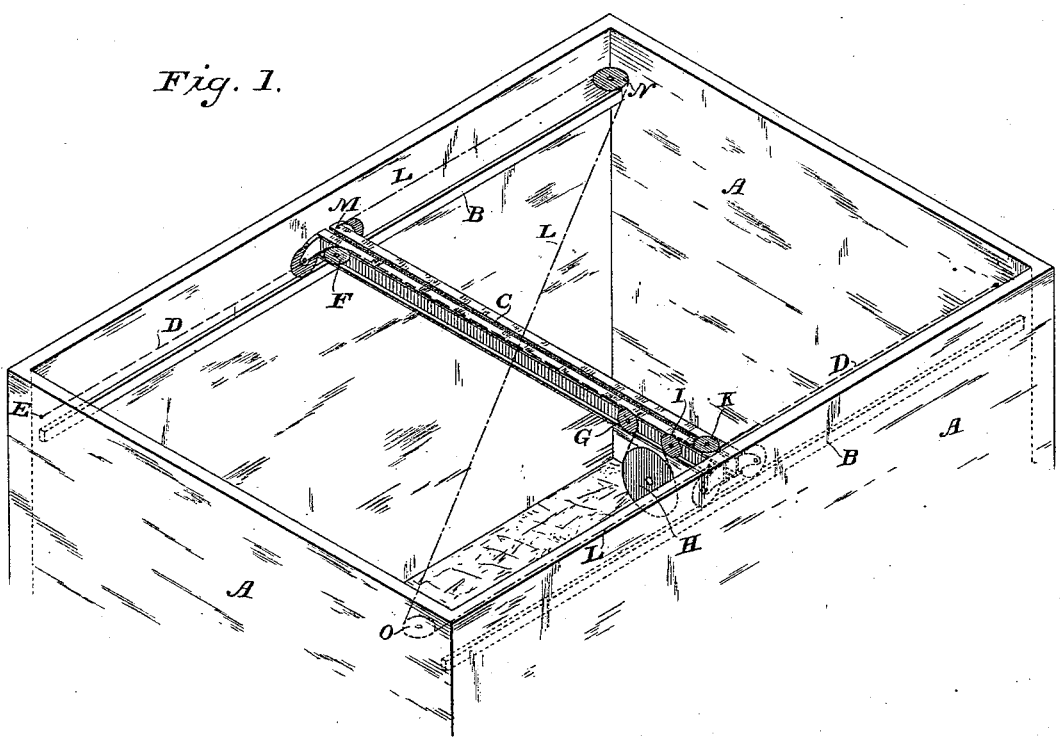
Figure 2:
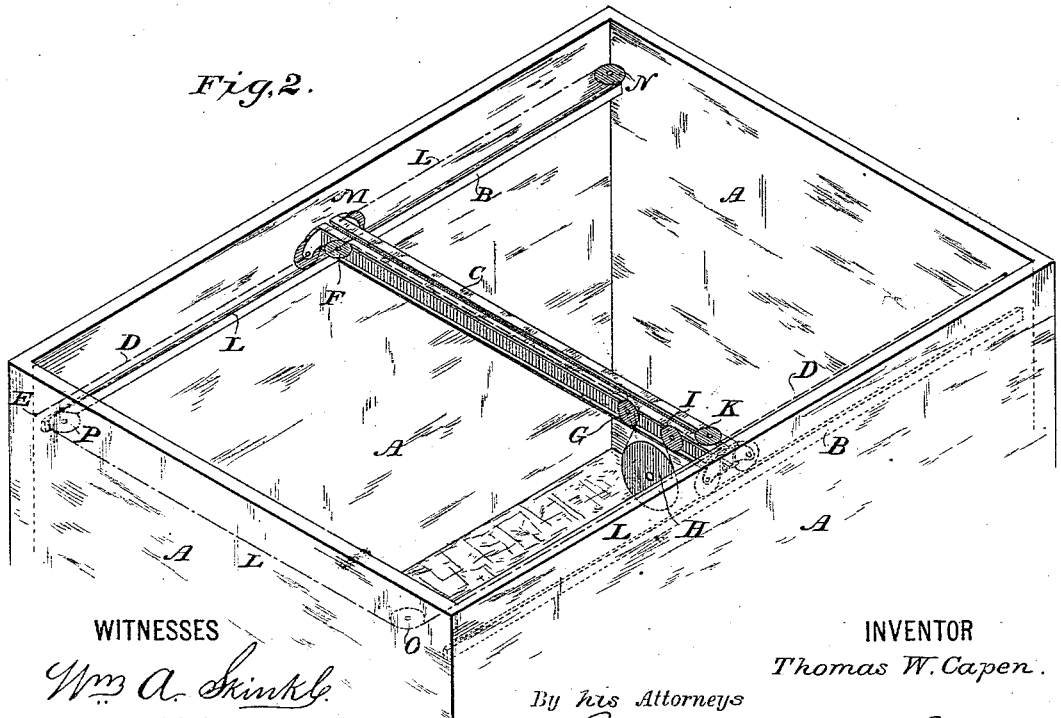
Figure 3:
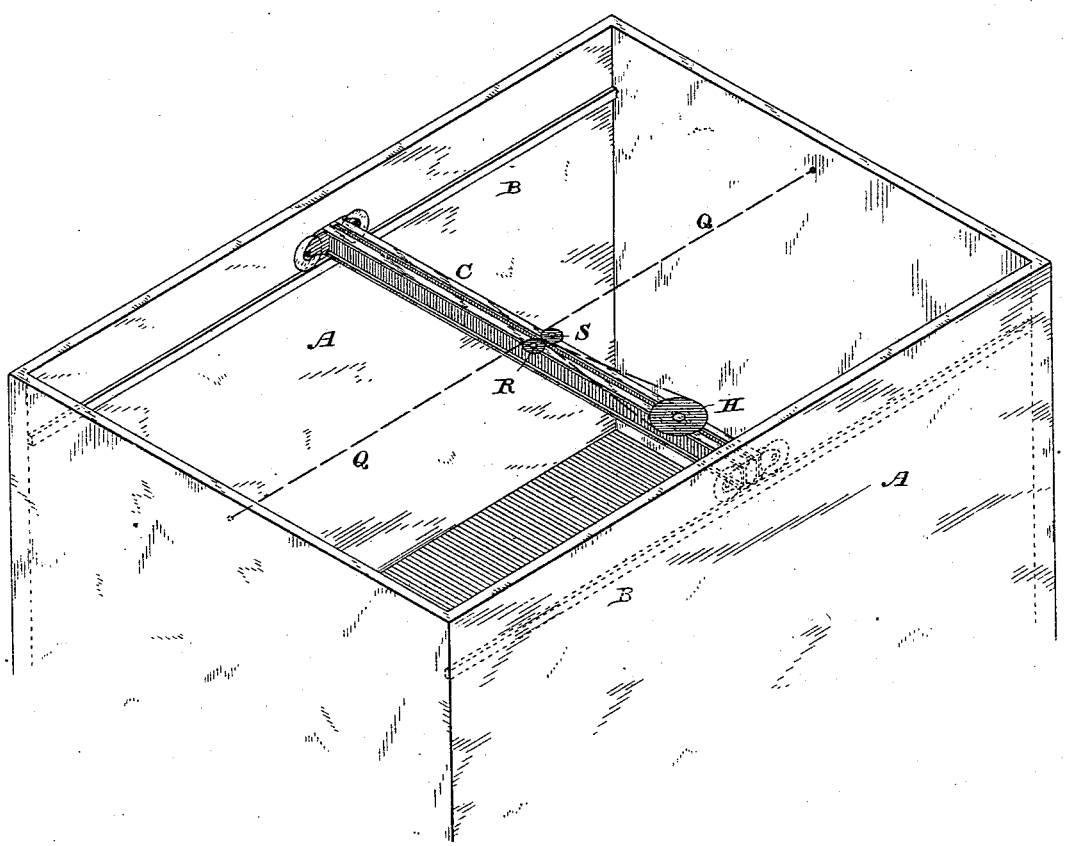

In the accompanying drawings Figures 1, 2, 3 are diagrammatical perspective views, illustrating in outline the construction and operation of my improvements, without reference to mechanical details.

In these drawings, A indicates a suitable frame for supporting the bridge-tracks B of a traveling crane, and C indicates the bridge in position upon its tracks.

In Fig. 1, D indicates a rope or cable for moving the bridge, with one end secured at E, near one corner of the frame, thence passing along the left-hand side of the frame over a sheave, F, upon one end of the bridge, thence along the bridge over a sheave, G, near the other end of the bridge, thence down around a grip-wheel, H, thence up over a sheave, I, thence around a sheave, K, thence along the right-hand side of the frame to the corner diagonally opposite from the starting-point, where it is again secured. L indicates another rope or cable, secured at one end to one end of the bridge at M, thence passing along the left-hand side of the frame around a sheave, N, thence diagonally across to the opposite corner of the frame around a sheave, O, thence along the right-hand side of the frame to the opposite end of the bridge, where it is secured. A revolution of the grip-wheel in one direction or the other, caused by any suitable mechanism for the purpose, it is obvious will cause the bridge to move upon its tracks in one direction or the other equally at its opposite ends, when the cables are applied as described, and strained so as to be sufficiently taut. The arrangement of the cables shown in Fig. 2 of the drawings is precisely the same in effect, the only difference being that the cable L, instead of passing diagonally from one corner of the frame to the other, is led back along the left-hand side of the frame over the sheave P, thence across one end of the frame around sheave O, and thence to the bridge.

Instead of using two cables, it is practicable, where the bridges are very short and the trucks have a wide wheel-base to prevent cramping, to use a single cable, pulling at the center of the bridge, as illustrated in Fig. 3.

In Fig. 3, Q indicates the cable secured at one end of the frame, thence passing over a sheave, R, at the center of the bridge, thence around the grip-wheel H, thence around another sheave, S, at the center of the bridge, thence to the opposite end of the frame, where it is again secured. The grip-wheel in this construction is shown near one end of the bridge; but it might be located exactly in line with the center of the bridge or at any other point, and if located exactly in the center of the bridge

Having thus described my invention, what I claim to be new, and desire to secure by Letters Patent of the United States, is—

1. The combination of the bridge of a traveling crane with a single fixed cable passing over a grip-wheel on said bridge, so that the revolution of the grip-wheel causes the bridge to travel in either direction, as desired.

2. The combination, with the bridge of a traveling crane, of a fixed cable and a moving cable, one cable being used as a means of propulsion, and the other cable being used to cause the equal motion of the opposite end of the bridge to that being propelled by that cable to which the propelling force is applied.

In testimony whereof I have hereunto subscribed my name this 27th day of March, A. D. 1883.

THOS. WELLS CAPEN.

Witnesses:
GEO. E. WHITE,
SCHUYLER MERRITT.